United States Patent [19]
Holden

[11] Patent Number: 5,775,719
[45] Date of Patent: Jul. 7, 1998

[54] CONTROL ARM ALIGNMENT MECHANISM

[75] Inventor: Jerry Lee Holden, New Baltimore, Mich.

[73] Assignee: General Motors Corporation, Detroit, Mich.

[21] Appl. No.: 822,630

[22] Filed: Mar. 21, 1997

[51] Int. Cl.$^6$ ................................................ B62D 17/00
[52] U.S. Cl. .................................................... 280/661
[58] Field of Search ............................. 280/661, 673, 280/96.1

[56] References Cited

U.S. PATENT DOCUMENTS

| | | | |
|---|---|---|---|
| 4,420,170 | 12/1983 | Wysocki | 280/661 |
| 4,493,493 | 1/1985 | Satchell et al. | 280/661 |
| 4,650,208 | 3/1987 | Mason | 280/661 |
| 4,736,964 | 4/1988 | Specktor | 280/661 |
| 5,301,977 | 4/1994 | Schlosser et al. | 280/661 |

OTHER PUBLICATIONS

General Motors Corporation—Service Technology Group; 1996 C/K Truck Service Manual–13 Book 1; Sep. 5, 1995; pp. 3A–5–3A–12.

Primary Examiner—Paul N. Dickson
Attorney, Agent, or Firm—Jeffrey A. Sedlar

[57] ABSTRACT

A control arm adjustment mechanism includes a frame bracket connected to a vehicle frame with a bolt extending through the frame bracket. A cam is keyed to the bolt and has a spiraling eccentric slot with the guide tab extending through the eccentric slot so that rotation of the bolt causes the guide tab to track within the eccentric slot causing a displacement of the bolt and a connected control arm end. A nut is threaded onto the bolt so that when the nut is torqued, the bolt is prevented from sliding. To adjust control arm positioning relative to the frame, the nut is loosened without being completely removed, the bolt is rotated to align a selected indicator mark with the first guide tab and the nut is retorqued.

3 Claims, 1 Drawing Sheet

CONTROL ARM ALIGNMENT MECHANISM

TECHNICAL FIELD

The present invention relates to a control arm alignment mechanism and more particularly, to an alignment mechanism providing adjustment between a control arm end and a vehicle frame resulting in a device for adjusting camber and caster in aligning vehicle steering.

BACKGROUND OF THE INVENTION

In a four arm suspension such as a double wishbone type, the control arms function to support vehicle loads while providing a means for permitting relative movement between the body and tires. The control arms effect a connection between the steering knuckle and the vehicle body's frame and therefore, locate the tire and wheel relative to the body. As a result, the control arms operate as a link in establishing proper wheel alignment. Front wheel alignment generally refers to the angular relationship between the front wheels, the front suspension attaching components, and the road. Important factors in a given vehicle's wheel alignment typically include wheel toe-in, wheel camber and axle caster. The two factors most pertinent to the present invention are camber and caster. Camber is generally characterized by the inward or outward tilting of the vehicle's wheels from vertical. Caster is typically characterized by the angular deviation of the steering axis from vertical when viewed from the side of a vehicle or by the distance at the road that the wheel contact point lies behind the point at which the extended steering axis meets the road.

The extent of camber and caster determines the reaction forces that are applied to a given wheel by the road surface during rotation when the vehicle is in motion. Satisfactory vehicle operation will occur over a relatively wide range of front wheel alignment settings. When the alignment settings vary beyond tolerances however, some means of adjustment is needed. Generally, a mechanism is provided for adjusting the control arm's connecting point positioning relative to the vehicle body to reestablish a preferred reaction force distribution on the wheel.

One known method of providing for wheel alignment when camber or caster is out of tolerance involves the use of a frame bracket for attaching the control arm to the frame with a prepared knockout being provided for adjusting the relative location of the control arm ends to the frame. The frame bracket is rigidly connected to the frame and includes a pair of openings with the knockouts provided in the area of the openings. The knockouts generally comprise a partially sheared enlarged area about the openings. Flanges are formed on the bracket near at least one end of the openings and provide reaction surfaces for the cam to work against. A bolt extends through the frame bracket openings maintaining a mating control arm end in a selected spatial position. The bolt is placed in the frame bracket openings, which are located at the precise design position that is predetermined for optimal camber and caster on the particular vehicle. To adjust the wheel's camber or caster, the control arm end is repositioned within the frame bracket resulting in a locus change relative to the vehicle frame. In order to enable repositioning, the bolt is removed and the control arm is completely extracted from its assembled position in the frame bracket. Subsequently, a specially designed tool is used to remove a selected knockout from around the relative opening in the frame bracket. The control arm end is then reassembled into the frame bracket.

The bolt typically captures a pair of cam washers adjacent the frame bracket which, when rotated generate a grounded force against the flange, transferring a reaction force to the bolt. Generally, when the bolt is positioned within the openings without the knockouts removed, the cams play no part in setting the camber and caster alignment. For adjustment purposes, when the cam is rotated against the flange, the bolt is forced toward the opposite end of the frame bracket opening into a location from where the knockout has been removed. If bi-directional positioning is provided, reaction surfaces must be formed near both the inboard and the outboard sides of the frame bracket openings. The alignment of the wheel relative to the vehicle body is changed by relocating the control arm ends, thus altering camber and caster. Since the typical control arm includes two control arm ends which are similarly adjustably attached to the vehicle frame, aligning camber and caster is further complicated by the required disassembly and reassembly of two joints. Additionally, once the knockouts have been removed from the frame bracket, they cannot be replaced, thus, the process is irreversible.

For adjustment purposes, complete disassembly of the control arm end from the frame bracket is undesirably required, increasing the time and complexity associated with camber or caster adjustment. Removal of the knockout for adjustment purposes also undesirably removes the original positively locked-in means of alignment provided by the precisely located frame bracket openings. In order to reestablish positive alignment such that the bolt cannot slip within the now enlarged opening in the frame bracket, it is important that a sufficient torque be applied to the assembled joint to prevent slippage.

SUMMARY OF THE INVENTION

An aspect of the present invention provides a control arm alignment mechanism that results in a new and improved method of aligning the front wheels of an automotive vehicle to achieve varying degrees of caster and camber adjustment with infinitely variable positive alignment increments. In adjusting camber or caster utilizing the present invention, a frame bracket is connected to the vehicle frame and includes a pair of opposed walls with correspondingly disposed elongated openings. The frame bracket forms a guide tab near one end of at least one of the openings. A bolt extends through the wall's opening with a control arm end captured between the walls by the bolt and with at least one cam keyed to the bolt and forced against one of the walls when the bolt is placed in tension. The cam includes a pivot opening corresponding in shape to the cross section of the bolt so that the cam cannot substantially rotate with respect to the bolt. The cam also includes an eccentric slot that spirals about the pivot opening with the guide tab extending into the slot so that rotation of the bolt causes the guide tab to track within the groove resulting in displacement of the bolt along the elongated opening. Displacement of the bolt within the elongated openings of the frame bracket moves the control arm end within the walls adjusting the relationship of the control arm end relative to the frame and varying camber and caster.

Reaction force is generated between the cam and the guide tab, enabling bi-directional adjustment through reversible rotation of the bolt. Optionally, the cam includes a series of indicating marks that can be variously aligned with the guide tab and are indicative of the degree to which the alignment has been adjusted. Positioning of the guide tab within the cam's eccentric slot provides for positive alignment, with the bolt being positionable anywhere within the length of the elongated openings and being inhibited from slipping by engagement of the guide tab with the sides of the slot. Camber or caster is adjusted without the need to disassemble the control arm ends from the frame brackets and any steps made in the alignment process are reversible.

DESCRIPTION OF THE PREFERRED EMBODIMENT

Figure 1:
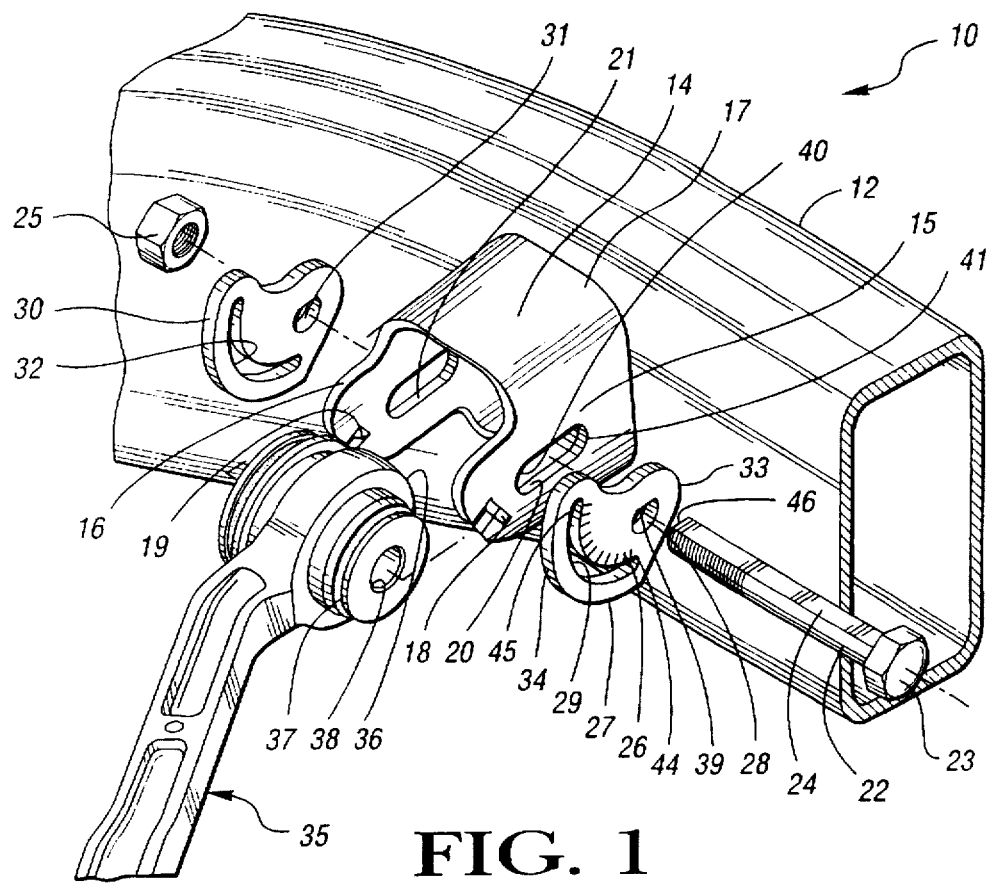
FIG. 1 is a partially exploded fragmentary schematic perspective view of a control arm adjustment mechanism according to the present invention.

Referring to the drawings, illustrated in FIG. 1 is a control arm adjustment mechanism designated in the aggregate as 10. The control arm adjustment mechanism 10 includes a frame bracket 14 that is rigidly attached to a vehicle body and specifically, to the vehicle body's frame rail 12 by a conventional means such as welding. The frame bracket 14 is generally U-shaped and includes two opposed walls 15 and 16 that are disposed generally in rearward and forward locations respectively, along the frame rail 12. The walls 15 and 16 are joined together by intermediate wall 17, with the frame bracket 14 formed as a one-piece stamping from a conventional material such as steel. The walls 15 and 16 each extend laterally away from the frame rail 12 a distance further than the intermediate wall 17 so as to form a clearance opening. The wall 15 includes an elongated opening 20 that extends generally in a lateral direction from the frame rail 12. Wall 15 also includes a guide tab 18 that is sheared and bent generally rearwardly from the wall material itself and is disposed substantially in line with the long dimension of elongated opening 20, and spaced away from the outboard end 40 thereof. Similarly, the wall 16 includes an elongated opening 21 that extends generally in a lateral direction relative to the frame rail 12.

A guide tab 19 is sheared and bent in a generally forward direction and is formed integrally from the material of the wall 16. The guide tab 19 is disposed generally in line with the long dimension of elongated opening 21, and spaced away from the outboard end thereof. Optionally, the guide tabs 18,19 are placed near the inboard ends of the elongated openings 20,21. A substantially flat cam 27 is formed with a generally circular body 33 and includes extending lobe 34 that is formed integrally therewith. A pivot opening 28 having a flat side 39, is cut through the circular body 33 such that the pivot opening 28 is substantially D-shaped. An eccentric slot 29 is cut through the lobe 34 of cam 27 and spirals away from the pivot opening 28 from the end of 44 to the end 45. A series of indicator marks 26 are disposed along the edge of the eccentric slot 29. Another cam 30 is formed generally as a mirror image of the cam 27 and includes a pivot opening 31 and an eccentric slot 32. A bolt 22 includes a hex head 23 and a flat side 24 extending longitudinally from the end 46 to the head 23. A nut 25 is provided that includes internal threads corresponding to the external threads on bolt 22.

A control arm 35 is provided for supporting vehicle loads and for providing relative movement between the frame rail 12 and the vehicle's wheel (not illustrated). The control arm 35 is generally V-shaped and includes control arm end 36 and a second control arm end (not illustrated). Control arm 35 comprises the upper control arm in a short-long arm suspension system as is commonly used in automobiles. The control arm end 36 carries a bushing assembly 37 that is rotatably movable within the control arm end 36 and includes a bushing opening 38 that extends in a generally forward and rearward direction.

Figure 2:
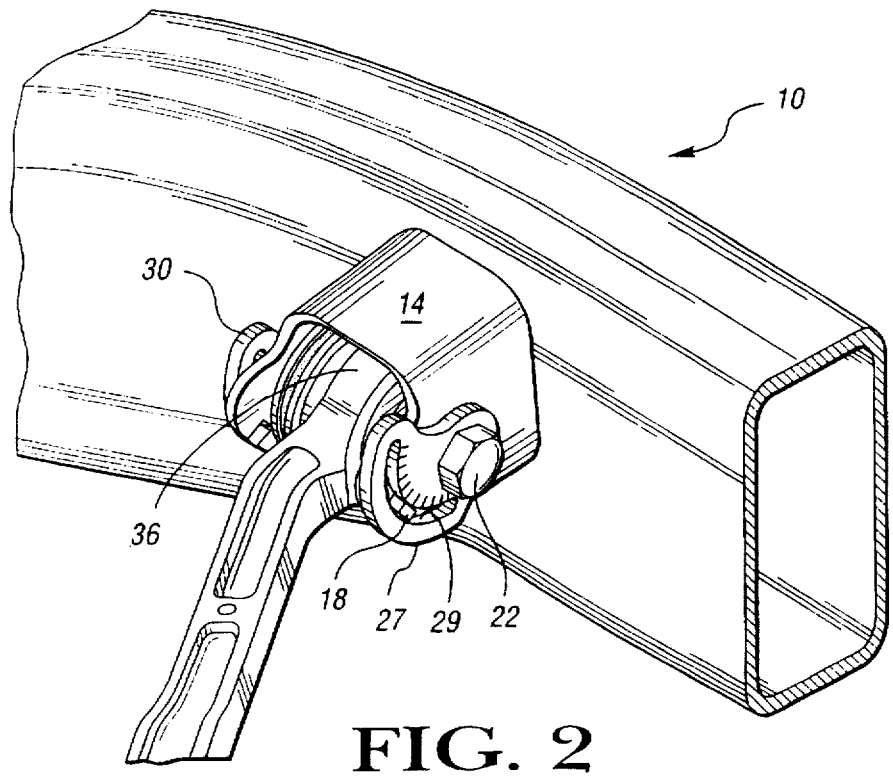
FIG. 2 is a fragmentary schematic perspective view of the control arm adjustment mechanism of FIG. 1 shown in an assembled condition.

Referring additionally to FIG. 2, the control arm adjustment mechanism 10 is shown in an assembled condition. The control arm end 36 nests within the frame bracket 14 with the bushing opening 38 aligned with the elongated openings 20 and 21. The bolt 22 extends through the pivot openings 28 and 31 of the cams 27 and 30 and, in concert with a nut 25, holds the cams 27, 30 against their respective walls 15, 16. The guide tab 18 extends into the eccentric slot 29 and the guide tab 19 extends into the eccentric slot 32, although in some applications the cam 27 is replaced with an ordinary circular washer. With a nut 25 torqued on to the bolt 22 cams 27, 30 are forced against their respective walls 15, 16 so as to be nonrotatable. The bolt 22 and nut 25 are torqued to a relatively high load that is sufficient to deflect the bushing 37. The bolt 22 is maintained in position along the elongated openings 20, 21 through frictional force and with assistance from the engagement of the guide tabs 18, 19 in the eccentric slots 29, 32. Movement of the bolt 22 in either an inboard or outboard direction within the elongated openings 20, 21 is substantially restricted. Accordingly, the control arm end 36 is locked in positive alignment within the frame bracket 14 such that the camber and caster adjustment of the associated wheel is maintained in the set position.

In order to vary the camber or caster alignment of the system, the nut 25 is loosened but is not completely removed from the bolt 22. The bolt 22 is rotated in the selected direction through means of the hex head 23 which, with the keyed on cams 27 and 30 rotating therewith, forces the bolt to slide within the elongated openings 20, 21 resulting in a corresponding variation of the control arm end 38 relative to the frame rail 12. Through use of the indicator marks 26, a selected mark is aligned with the guide tab 18 and while holding the bolt 22 in position, the nut 25 is re-torqued to lock the control arm adjustment mechanism 10 in the selected location. Through means of the present invention a straightforward means of adjusting camber and caster of the associated vehicle is provided with positive alignment established through means of the engagement between guide tabs 18, 19 and cams 27, 30 within eccentric slots 29, 32.

I claim:

1. A control arm alignment mechanism comprising:

a frame bracket connected to a vehicle frame, the frame bracket having a first wall with a first elongated opening, a guide tab extending substantially perpendicularly to the first wall, and a second wall disposed in a generally parallel and opposed relationship with the first wall, the second wall including a second elongated opening positioned in correspondence with the first elongated opening;

a bolt extending through the first and second elongated openings and having a shaped cross section;

a cam positioned on the bolt adjacent the first wall and having a pivot opening corresponding in shape to the shaped cross section of the bolt so that the cam is keyed to the bolt and cannot rotate substantially with respect to the bolt, wherein the cam has an eccentric slot spiraling about the pivot opening, with the guide tab extending through the eccentric slot so that rotation of the bolt causes the guide tab to track within the eccentric slot causing a displacement of the bolt along the first and second elongated openings; and a control arm end having a bushing with an opening through which the bolt extends maintaining the position of the control arm end between the first and the second walls wherein displacement of the bolt along the first and the second elongated openings moves the control arm end within the first and the second walls to adjust the relationship of the control arm end to the frame.

2. A control arm alignment mechanism comprising:

a frame bracket connected to a vehicle frame, the frame bracket having a first wall with a first elongated opening, a guide tab extending substantially perpendicularly to the first wall, and a second wall disposed in a generally parallel and opposed relationship with the first wall, the second wall including a second elongated opening positioned in correspondence with the first elongated opening;

a bolt extending through the first and second elongated openings and having a shaped cross section;

a cam positioned on the bolt adjacent the first wall and having a pivot opening corresponding in shape to the shaped cross section of the bolt so that the cam is keyed to the bolt and cannot rotate substantially with respect to the bolt, wherein the cam has an eccentric slot spiraling about the pivot opening, with the guide tab extending through the eccentric slot so that rotation of the bolt causes the guide tab to track within the eccentric slot causing a displacement of the bolt along the first and second elongated openings; and a control arm end having a bushing with an opening through which the bolt extends maintaining the position of the control arm end between the first and the second walls wherein displacement of the bolt along the first and the second elongated openings moves the control arm end within the first and the second walls to adjust the relationship of the control arm end to the frame;

wherein the cam includes a series of indicator marks so that the guide tab is alignable with a selected mark indicating a magnitude of adjustment of the control arm end relative to the frame.

3. A control arm alignment mechanism comprising:

a frame bracket connected to a vehicle frame, the frame bracket having a first wall with a first elongated opening, a first guide tab extending from the first wall substantially perpendicularly to the first wall, and a second wall disposed in a generally parallel and opposed relationship with the first wall, the second wall including a second elongated opening positioned in correspondence with the first elongated opening and a second guide tab extending from the second wall substantially perpendicularly to the second wall;

a bolt extending through the first and second elongated openings and having a D-shaped cross section;

a first cam positioned on the bolt adjacent the first wall and having a first D-shaped opening corresponding in shape to the D-shaped cross section of the bolt so that the first cam is keyed to the bolt and cannot rotate substantially with respect to the bolt, wherein the first cam has a first eccentric slot spiraling about the first D-shaped opening, with a series of indicator marks formed on the first cam along the first eccentric slot, wherein the first guide tab extends through the first eccentric slot;

a second cam positioned on the bolt adjacent the second wall wherein the first and the second cams are identically aligned with respect to the bolt, the second cam having a second D-shaped opening corresponding in shape to the D-shaped cross section of the bolt so that the second cam is keyed to the bolt and cannot rotate substantially with respect to the bolt, wherein the second cam has a second eccentric slot disposed in mirror-image correspondence with the first eccentric slot and spiraling about the second D-shaped opening, wherein the second guide tab extends through the second eccentric slot so that rotation of the bolt causes the first guide tab to track within the first eccentric slot and the second guide tab to track within the second eccentric slot causing a displacement of the bolt along the first and second elongated openings;

a first control arm end having a bushing opening with the bolt extending through the bushing opening maintaining position of the control arm end between the first and the second walls wherein displacement of the bolt along the first and the second elongated openings moves the control arm end within the first and the second walls to adjust a positional relationship of the control arm end relative to the frame and wherein the amount of positional relationship adjustment is gauged by alignment of the first guide tab with the series of indicator marks so that the first guide tab is alignable with a selected indicator mark indicating a magnitude of adjustment of the control arm end relative to the frame; and a nut threaded onto the bolt wherein when the nut is torqued the bolt is prevented from sliding along the first and second elongated openings so that the bolt is disposed in the first elongated opening between a first and a second end of the elongated opening and away from both the first and the second ends, and wherein, in order to adjust the control arm relative to the frame, the nut is loosened without being completely removed, the bolt is rotated to align a selected indicator mark with the first guide tab and the nut is retorqued.

* * * * *